United States Patent
Shah et al.

(10) Patent No.: US 11,349,927 B2
(45) Date of Patent: *May 31, 2022

(54) SMART-DEVICE COMMUNICATION IN RESPONSE TO EVENT

(71) Applicant: Capital One Services, LLC, McLean, VA (US)

(72) Inventors: Salik Shah, Washington, DC (US); Sophie Bermudez, Washington, DC (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/653,998

(22) Filed: Oct. 16, 2019

(65) Prior Publication Data

US 2020/0244737 A1    Jul. 30, 2020

Related U.S. Application Data

(63) Continuation of application No. 16/261,928, filed on Jan. 30, 2019, now Pat. No. 10,498,829.

(51) Int. Cl.
| | |
|---|---|
| *G06F 15/177* | (2006.01) |
| *H04L 67/12* | (2022.01) |
| *H04L 67/10* | (2022.01) |
| *H04W 4/80* | (2018.01) |
| *H04L 67/55* | (2022.01) |
| *G06N 20/00* | (2019.01) |
| *G08B 13/22* | (2006.01) |

(52) U.S. Cl.
CPC .............. *H04L 67/12* (2013.01); *H04L 67/10* (2013.01); *H04L 67/26* (2013.01); *H04W 4/80* (2018.02); *G06N 20/00* (2019.01); *G08B 13/22* (2013.01)

(58) Field of Classification Search
None
See application file for complete search history.

(56) References Cited

U.S. PATENT DOCUMENTS

| | | | |
|---|---|---|---|
| 9,888,337 B1* | 2/2018 | Zalewski | G06Q 30/0635 |
| 10,742,939 B1* | 8/2020 | Sommerlatt | G06Q 20/04 |
| 2016/0214535 A1 | 7/2016 | Penilla et al. | |
| 2017/0169688 A1* | 6/2017 | Britt | G08B 21/0453 |
| 2017/0171204 A1* | 6/2017 | Forood | H04W 4/00 |
| 2017/0187995 A1* | 6/2017 | Scalisi | G08B 13/1472 |
| 2017/0351505 A1* | 12/2017 | Riedl | G06F 3/002 |

(Continued)

OTHER PUBLICATIONS

International Search Report and Written Opinion for International Patent Application No. PCT/US2020/015781 dated May 4, 2020, 13 pages.

*Primary Examiner* — Phuoc H Nguyen
(74) *Attorney, Agent, or Firm* — KDB Firm PLLC

(57) ABSTRACT

A smart device communication system and method are disclosed. The smart device communication system is based on an Internet of Things (IoT) device attached to or in vicinity to an object. In response to an occurrence related to the object, the IoT device sends an event signal that is received by one or more community-capable IoT devices that are geographically co-located with the object. The community-capable IoT device(s) respond by taking one or more actions in response to receiving the event signal. The IoT device and the community-capable IoT device(s) are not co-owned.

20 Claims, 11 Drawing Sheets

(56) References Cited

U.S. PATENT DOCUMENTS

2019/0349426 A1*  11/2019  Smith ................... H04L 67/104
2019/0379734 A1*  12/2019  Zavesky ............. H04L 67/1076
2020/0050494 A1*   2/2020  Bartfai-Walcott .... G06F 9/5083

* cited by examiner

200A

200B

800

900

SMART-DEVICE COMMUNICATION IN RESPONSE TO EVENT

RELATED APPLICATIONS

This application is a continuation of U.S. patent application Ser. No. 16/261,928, entitled "SMART-DEVICE COMMUNICATION IN RESPONSE TO EVENT" filed on Jan. 30, 2019. The contents of the aforementioned application are incorporated herein by reference.

BACKGROUND

The concept of combining computers and networks to remotely monitor and control devices has been around for some time. The Internet of Things (IoT) is a network of devices, including, but not limited to, vehicles and home appliances, that contain electronics, software, sensors, and actuators, allowing these things to connect, interact, and exchange data. The IoT involves extending Internet connectivity beyond devices such as smartphones and computers, to a variety of traditionally non-Internet-enabled physical devices and everyday objects, allowing them to be remotely controlled and/or monitored.

The recent interest in IoT by a diverse audience, including consumers, is driven by several factors. The widespread adoption and decreased cost of Internet Protocol (IP) based networking, the increase in computing power, lower price points, and lower power consumption of devices, cutting-edge manufacturing advances, allowing miniaturization of devices that are highly capable, advances in data analytics, and advances in cloud computing have contributed to IoT's popularity and focus. With only minimal or no human interaction, IoT devices are generally known to generate, exchange, and consume data and they may connect to remote servers or other cloud-based devices for data collection, management, and analysis.

IoT is available to divergent industry sectors, from traffic and weather control, autonomous vehicles, smart homes, consumer electronics, wearables, security, farming, fitness, manufacturing standardization and automation, mining, seismic monitoring, smart metering, flight navigation, shipment tracking, and so on.

BRIEF DESCRIPTION OF THE DRAWINGS

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

In accordance with the embodiments described herein, a smart device communication system and method are disclosed. The smart device communication system is based on an Internet of Things (IoT) device attached to or in vicinity to an object. When the object is tampered with in some way, the IoT device sends an event signal that is received by one or more community-capable IoT devices that are geographically co-located with the object. The community-capable IoT device(s) respond by taking one or more actions in response to receiving the event signal. The IoT device and the community-capable IoT device(s) are not co-owned. Optionally, the IoT device also notifies a mobile phone or other hand-held device that is co-owned by the owner of the object of the event.

Figure 1:
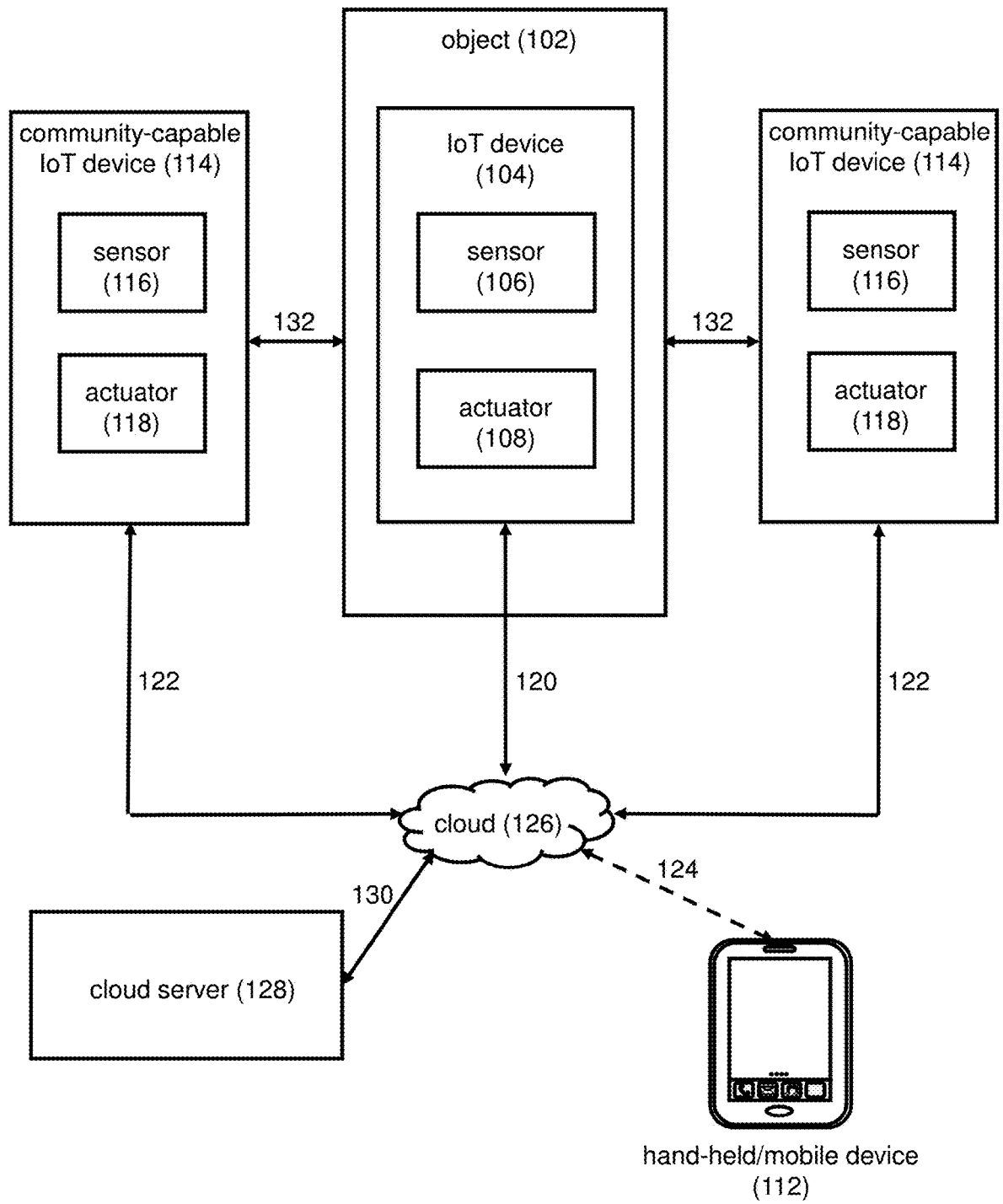
FIG. 1 is a block diagram of a smart device communication system and method, according to some embodiments.

FIG. 1 is a block diagram of a smart device communication system 100, according to some embodiments. The smart device communication system 100 features an object 102 that has in its vicinity an IoT device 104. The IoT device 104, based on an action involving the object 102, sends an event signal, which causes one or more community-capable IoT devices 114 to respond, as described in more details below. Optionally, a notification signal is also received by a hand-held or other type of mobile device 112.

IoT device 104 features a sensor 106 and an actuator 108, although the IoT device may include multiples of each. Similarly, IoT devices 114 each show one sensor 116 and one actuator 118, though each may have more than one. The sensors are detection devices that sense physical information such as movement, temperature, flow, and so on. The actuators are devices that perform some action, such as causing a light to turn on or a horn to blast. The IoT devices may have software residing on these devices that perform some operation in response to the sensor sensing, such as invoking one of the actuators. Smartphones are examples of IoT devices that have resident software. In other examples, the software that is reacting to the sensors and invoking the actuators resides outside the IoT device.

In some embodiments, the IoT device 104 and the one or more community-capable IoT devices 114 are able to communicate with one another by being connected to a cloud service or cloud 126. The cloud service 126 may be an Internet cloud service, a WiFi connection in the home, a Wireless Local Area Network (WLAN), a Wireless Wide Area Network (WWAN), a proprietary network, and so on.

Also connected to the cloud 126 is a cloud server, also referred to herein as a server 128. A server in an office provides security, control, and performance for computing devices connected to the server in the office. A cloud server similarly provides security, control, and performance for devices connected to a cloud service. Although it may be physically disposed in the office, the cloud server also may physically reside elsewhere, in a virtualized environment that is managed by the cloud service. Additional servers (not shown) may be connected to the cloud service 126 and may provide additional functionality to the IoT devices.

The smart device communication system 100 features two-way communication channels 120 and 122 between respective IoT devices 104 and 114 and the cloud 126, a two-way communication channel 130 between the cloud 126 and the cloud server 128, and an optional two-way communication channel 124 between the cloud and the hand-held/mobile device 112. There may also be direct communication between the IoT device 104 and the one or more community-capable IoT devices 114, via channel 132. In some embodiments, these channels of communication are wireless transmission channels, and may include WiFi, Bluetooth, Near Field Communication (NFC), and other types of communication.

Figure 2A:
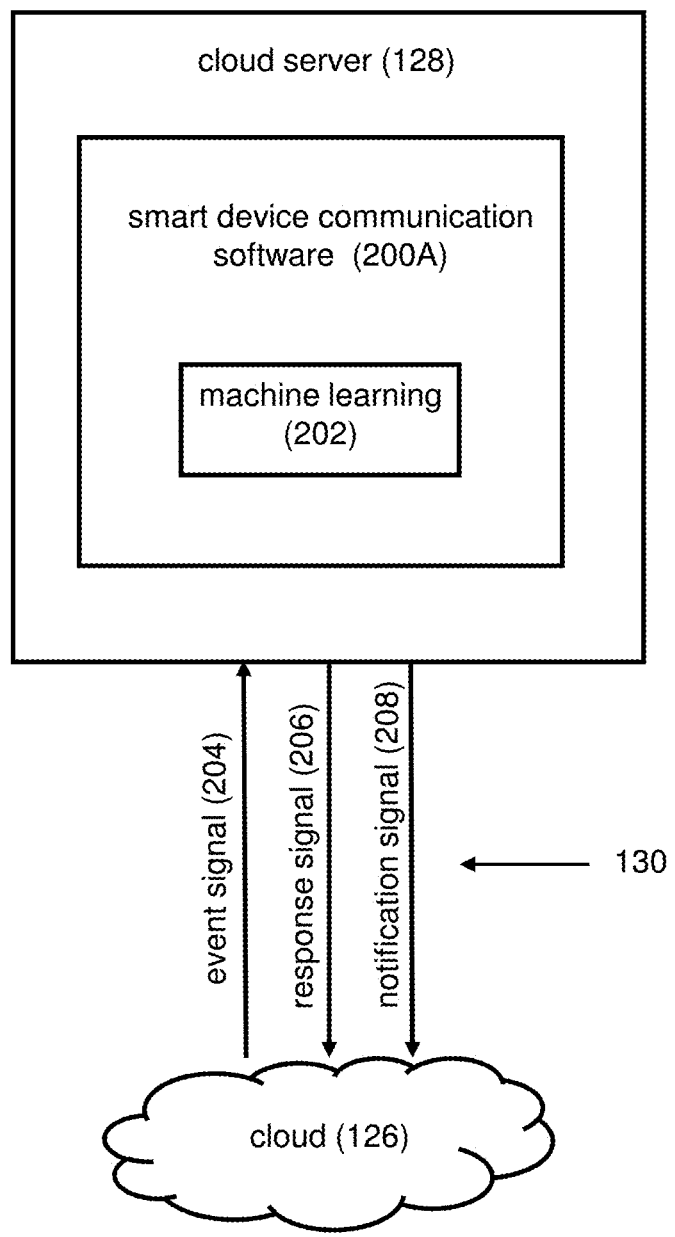
FIG. 2A and FIG. 2B are block diagrams illustrating alternative mechanisms for implementing software for the smart communication device system of FIG. 1, according to some embodiments.
Figure 2B:
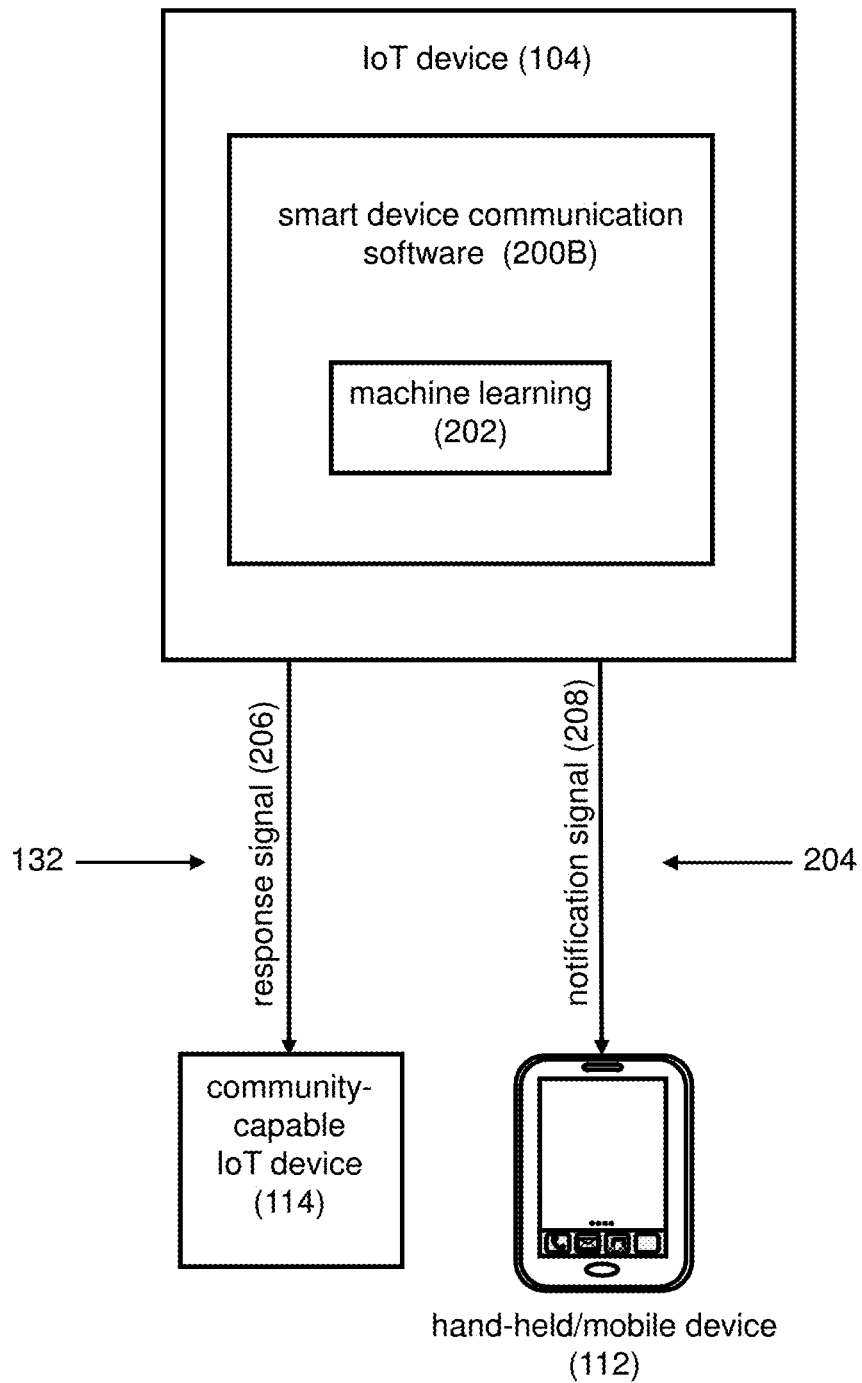

In some embodiments, the sensors and actuators of the IoT devices in FIG. 1 are managed by software not residing on the IoT devices, but accessible via the cloud service 126. FIG. 2A and FIG. 2B are simplified block diagrams featuring smart device communication software 200A and 200B, respectively, according to some embodiments. In FIG. 2A, smart device communication software 200A is stored on the cloud server 128; in FIG. 2B, the smart device communication software 200B is stored on the IoT device 104 associated with the object 102. Hereinafter, the software is known as smart device communication software 200A, 200B, or simply 200. In both implementations, the software 200 communicates with the other IoT devices by way of the cloud service 126 to effect a desired response.

In FIG. 2A, the smart device communication software 200A, communicating through the cloud service 126, may receive an event signal 204 from one or more sensors, such as the sensor 106 on the IoT device 104 in vicinity to the object 102 (FIG. 1). The smart device communication software 200 may issue a response signal 206 to activate one or more actuators, such as the actuators 118 of the community-capable IoT devices 114 (FIG. 1). Optionally, the smart device communication software 200 may issue a notification signal 208 in response to the event signal, to be received by a hand-held or mobile device, such as the mobile device 112 (FIG. 1).

In FIG. 2B, the smart communication software 200B receives the event signal 204 from one or more sensors on the IoT device 104 in vicinity to the object (FIG. 1). Because the software is coupled with the sensor(s) on the IoT device, no event signal is issued. Rather, the software 200B, resident upon the IoT device 104, sends a response signal directly to the community-capable IoT device(s) 114 over communication channel(s) 132. Similarly, the optional notification signal 208 may be issued directly to the hand-held/mobile device 112 by way of its own communication channel 204. In an embodiment, communication with the hand-held/mobile device 112 is achieved via a cellular network.

In some embodiments, both the IoT device 104 and the cloud server 128 of FIG. 1 may include some software elements and the smart device communication software 200 may be distributed between these devices. Further, the single cloud server 128 illustrated in FIG. 1 and FIG. 2A may consist of more than one server, and the multiple servers may be disposed in geographically disparate locations.

In addition to generate response 206 and, optionally, notification 208 signals, in response to receiving the event signal 204, the smart device communication software 200 also features machine learning capability 202, in some embodiments. The machine learning 202 enables the software to become smarter as more data is gathered over time. For example, if the IoT device is located in a person's vehicle, the smart device communication software 200 may be invoked when the person has left the vehicle and is not currently residing in the vehicle. The machine learning 202 of the software may be able to determine this information based on the weight of the person, using facial recognition, or using fingerprints.

With reference to both FIG. 1 and FIG. 2, depending on what the object 102 is, the IoT device 104 may or may not be electrically connected to the object. The sensor 106 of the IoT device 104 may be able to detect a tampering of the object without being electrically connected thereto. Upon notice of a tampering of the object 102, the sensor 106 sends the event signal 204, via communication channel, to the cloud 126, where it is received by the cloud server 128. The smart device communication software 200 thus sends a response signal 206, again through the cloud 126, to invoke an actuator 118 of one or more community-capable IoT device 114.

In some embodiments, both the event signal 204 and the response signal 206 are sent using Bluetooth, Near-Field Communication (NFC), Zigbee, Z-wave, or another form of communication between geographically co-located devices, with the channels being two-way communication. The communication aspect of the IoT device is described in more detail in conjunction with FIG. 9, below.

The community-capable IoT device 114 may also be referred to as a community-aware or community-responsive IoT device. In some embodiments, a community-capable IoT device 114 is an IoT device that, when receiving a response signal from a not commonly owned IoT device, the IoT device automatically activates its one or more actuators. In some embodiments, the response signal 206 is received from a geographically co-located IoT device. Not commonly owed, or not co-owned, means that the IoT device activating its one or more actuators is owned by someone other than the owner of the IoT device in vicinity of the object 102 that caused the event signal to be sent, in some embodiments.

Figure 4:
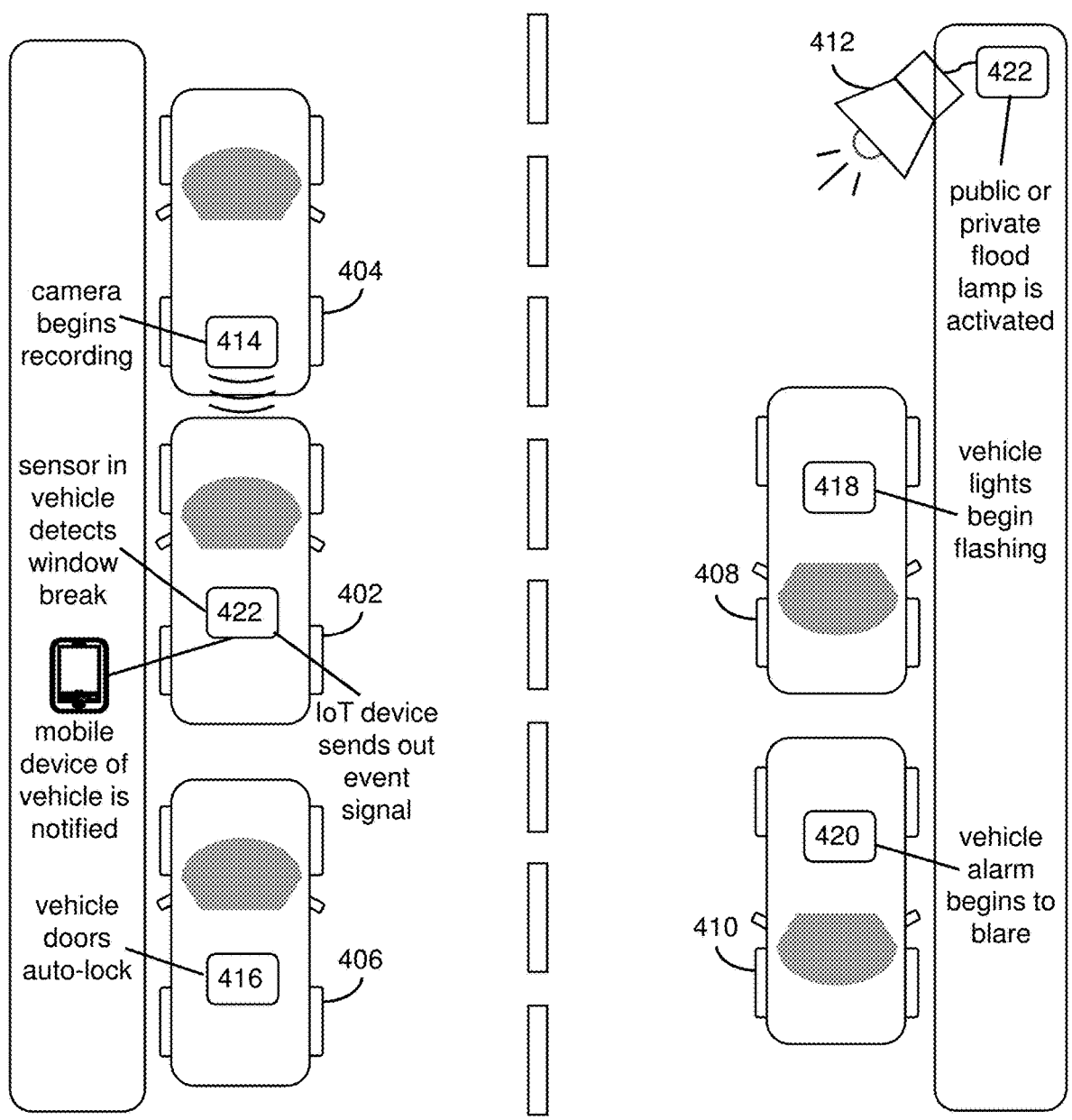
FIG. 4 is an illustration of the smart device communication of FIG. 1 in response to a car break-in, according to some embodiments.
Figure 5:
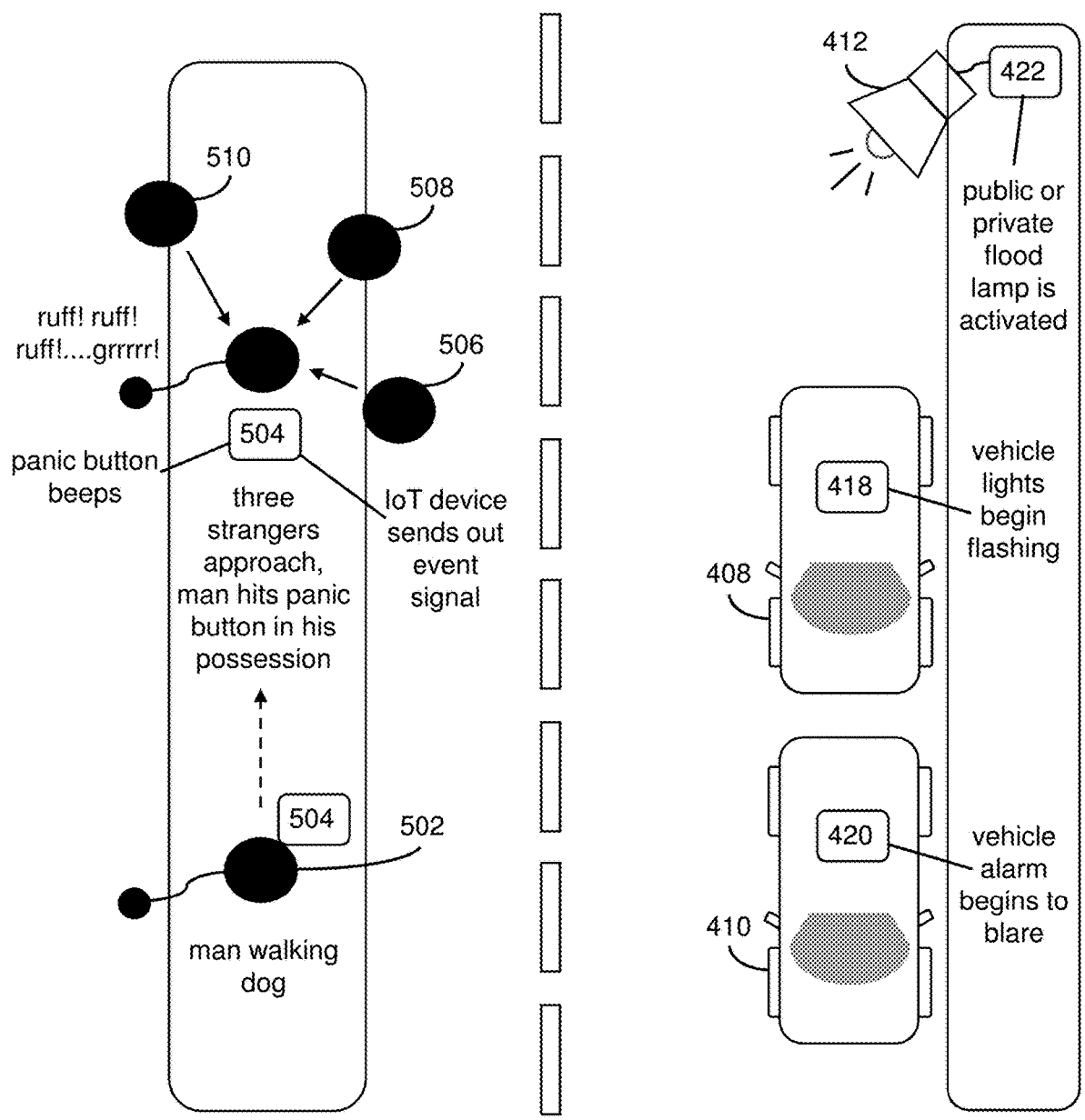
FIG. 5 is an illustration of the smart device communication of FIG. 1 in response to an attempted assault of a person, according to some embodiments.
Figure 6:
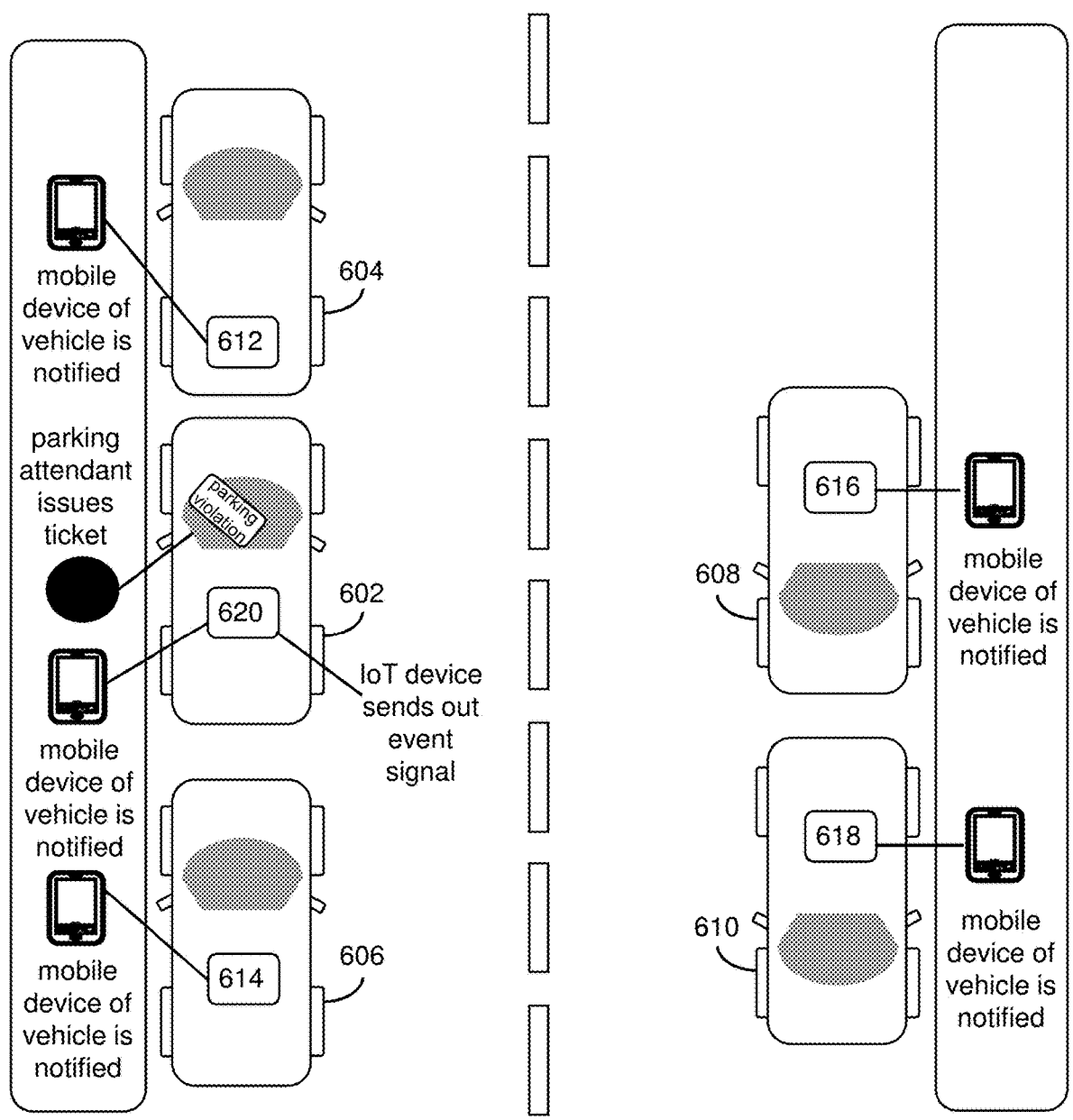
FIG. 6 is an illustration of the smart device communication of FIG. 1 in response to a vehicle getting a parking ticket, according to some embodiments.

The community-capable aspect of the IoT device may be an opt-in feature of the device, in which the owner of the IoT device invokes a setting to enable the device to be community-capable. Or, the IoT device may be sold as community-capable by default, such that the owner of the device, upon purchase, would explicitly disable the community capability of its recent purchase if the owner does not want its device to be community-capable. In some embodiments, the community capability of the IoT device is marketed to the consumer as providing community benefits, as illustrated in FIG. 4, FIG. 5, and FIG. 6, below, in addition to the original capabilities/features that make the IoT device desirable to the consumer.

Although two community-capable IoT devices 114 are illustrated in the smart device communication system 100 of FIG. 1, there may be one or many of them. The one or more actuators 118 activated by the community-capable IoT device(s) 114 may vary, depending on the event that triggers the response. Some embodiments are described in FIG. 4, FIG. 5, and FIG. 6, below.

Optionally, the event signal 204 may trigger a notification signal 208 to the hand-held or mobile device 112. The smart device communication device software 200, upon receipt of the event signal 204, generates the notification signal 120 to be received by the hand-held or other mobile device 112.

The operations of the smart device communication software 200 of the IoT device 104 are described further in the flow diagram of FIG. 7, below.

There are several different ways in which IoT devices may be in communication with one another. The IoT devices may be in device-to device communication. One example is a smart light bulb and light switch that is part of a home automation system. Communication between these devices can be achieved using small data packets at relatively low data rates. These data packets are sent through a wireless network, which may be the WiFi network in a residential home, and the packets are received by the smart light bulb, causing it to be turned on or off. Proprietary protocols, such as Bluetooth, Zigbee, or Z-wave, may enable such small packet/low data rate communication.

Another way two IoT devices may be in communication is known as device-to-cloud communication. Each IoT device connects to an Internet cloud service such as an Application Service Provider (ASP) to exchange data and control message traffic. How the IoT device connects to the ASP may be by wired Ethernet, WiFi, and other means. Examples of IoT devices using such services include smart thermostats, in which data is transmitted to the ASP for energy consumption analysis and, as a further benefit, the smart thermostat can be accessed via mobile or other hand-held devices.

Another way IoT devices may be connected is known as the device-to-gateway model. A local gateway device operates as an intermediary between the device and the cloud service. For example, the local gateway device may be the mobile phone or other hand-held device running an app to communicate with the IoT device and relay data from the device to a cloud service. Personal fitness apps are examples of the device-to-gateway model. Or there may be a hub that serves as a local gateway to all the smart devices in the home.

A back-end data sharing model is also a way in which IoT devices may be connected, enabling data from multiple IoT devices to be exported and subsequently aggregated and analyzed. The smart device communication system 100 of FIG. 1 may operate in one or more of these connection architectures.

Figure 3:
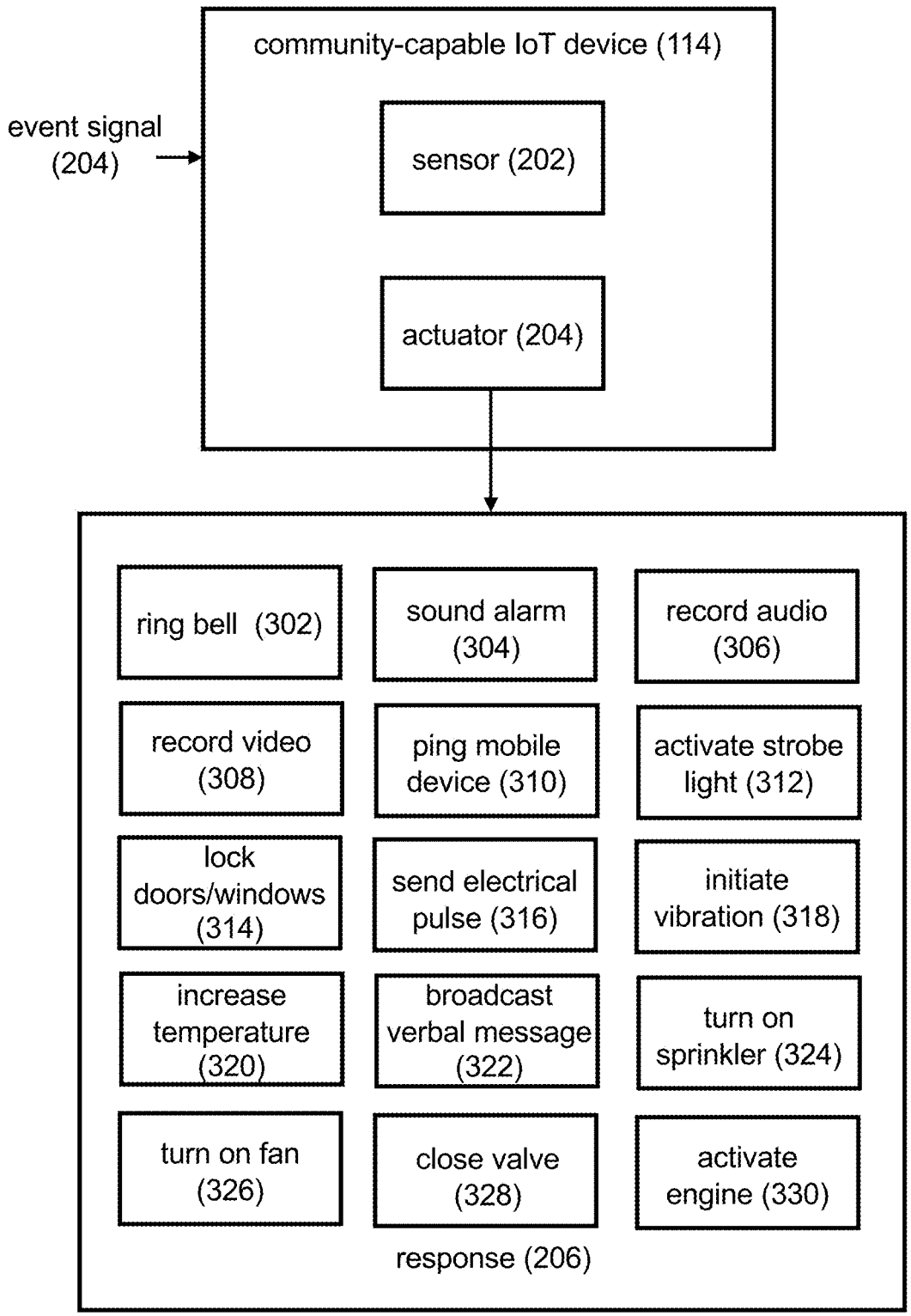
FIG. 3 is a block diagram illustrating possible responses by a community-capable IoT device in response to receiving an event signal, according to some embodiments.

FIG. 3 is a block diagram illustrating possible responses by a community-capable IoT device in response to receiving an event signal, according to some embodiments. The event signal 204 is issued by a sensor such as the sensor 106 on the IoT device 104 in vicinity to the object 102 (FIG. 1). In response, the smart device communication software 200 invokes the actuator 204, as described above, in generating the response 206.

Several responses 206 are shown. The event signal 204 may, for example, cause a camera to record a video 308, ping a mobile device 310, activate a strobe light 312, or lock doors or windows 314. Many of the responses will make sense in the context in which they are invoked. The list of responses 206 is not exhaustive but covers a range of possibilities enabled by IoT devices.

FIG. 4, FIG. 5, and FIG. 6 depict three scenarios in which the smart device communication system 100 of FIG. 1 may be invoked, according to some embodiments. For example, FIG. 4 depicts a scenario 400 in which an attempted break-in of a vehicle 402 takes place. Several cars are depicted on a street, both to the left and the right of the center median of a road. The vehicle 402 includes an IoT device 422, such as is described in FIG. 1, above, with the capability to detect tampering of an object. In this example, the object is a window of the vehicle 402.

Different types of IoT devices are present in the scenario 400. Five vehicles 402, 404, 406, 408, and 410, and one flood light 412 include IoT devices thereon, and all IoT devices in this example are considered community-capable. The IoT devices in this example are also geographically co-located to the IoT device of the vehicle 402.

Vehicle 404 includes a camera actuator 414, located at the rear of the vehicle. Vehicle 406 includes an automatic door-locking or unlocking actuator 416. Vehicle 408 includes a light actuator 418, which may be the vehicle front lights, rear lights, interior lights, parking lights, or all of the lights, or may be a separate light actuator that is part of a removable IoT device that happens to be inside the vehicle. Vehicle 410 includes an alarm actuator 420, which could alternatively be a bell, a whistle, a horn, or other device that makes an audible noise. The alarm actuator 420 may be part of the vehicle alarm or horn system or may be a separate noise actuator that happens to be inside the vehicle 410. The flood light 412 has an attached IoT device including an actuator 422 that turns the flood light on or off.

The scenario 400 begins by the IoT device 422 in the vehicle 402 detecting a break or attempted break of the object window (occurrence detection) and sends out an event signal. In some embodiments, the smart device communication system response is immediate. The camera in the vehicle 404 begins recording. The doors in the vehicle 406 automatically lock. The lights in the vehicle 408 begin flashing. The alarm in the vehicle 410 begins blaring. And, the flood lamp 412 turns on. In other words, all geographically co-located actuators automatically respond to the sensor 106 detection. With this much activity surrounding the break-in event, it is possible to imagine that the nefarious actors may want to leave the scene quickly.

In some embodiments, the smart device communication system 100 further enables the notification signal 208 to be sent to the mobile or other hand-held device of the owner of IoT device 422, which would generally be the owner of the vehicle 402. This could be useful when, for example, the vehicle 402 is parked outside the owner's home.

In some embodiments, the owner of the vehicle 402 may be able to access the data from the camera actuator 414 in the adjacent vehicle 404. The smart device communication software 200 may send a data request to a cloud server associated with the IoT device 414 (which may be a different server than the one on which the software resides) and download any recorded data associated with the occurrence.

In some embodiments, the IoT device 422 that includes window break detection (and possibly other capabilities) is not activated until the owner has locked the vehicle 402. This prevents the IoT device from reacting to an occurrence that is associated with normal use of the vehicle, such as opening or shutting the door, children banging on the window, and so on. As such, the IoT device 422 may be part of an integrated smart vehicular system.

The machine learning 202 of the smart device communication software 200 may be useful in this scenario. The IoT device 422 may, for example, know that the person entering the vehicle is the owner based on information such as bodyweight, facial recognition, or fingerprints. The machine learning 202 may also be able to detect whether the owner is in vicinity of the vehicle by sending a Bluetooth signal to detect wearables on the owner, a smartphone in possession of the owner, and so on.

FIG. 5 presents another scenario, an attempted assault, in which the smart device communication system 100 may be useful. Again, all IoT devices in this example are community-capable and geographically co-located. In the scenario 500, a man 502 with a panic button 504 in his possession, an IoT device, is walking his dog on a street. Suddenly, three strangers 506, 508, and 510 approach the man 502 from different directions. The man 502 activates his panic button 504, which itself includes a noise alert. However, because of the smart device communication system 100, the panic button IoT device also sends out an event signal, which causes the lights in vehicle 408 to begin flashing, the alarm in the vehicle 410 to begin blaring, and the flood light 412 to turn on. Where the vehicles are parked in front of homes or offices, these audible and visible actions may cause people to come outside to investigate. This and the ensuing light and noise from geographically co-located IoT-enabled devices might just be enough to cause the strangers to run away and stop the attempted assault.

In the scenario 500, the panic button may be thought of as both the object and the IoT device. No sensor is detecting tampering of the object, the panic button. Instead, the activation of an actuator inside the panic button, an alarm, sets the subsequent events in motion. In the car break-in scenario 400, the sensor operation (occurrence detection) automatically triggers subsequent action, whereas in the attempted assault scenario, the activation of an actuator by the human triggers the subsequent action by geographically co-located devices. The smart device communication system 100 is flexible enough to enable either automatic sensor or explicit actuator enabling to transmit an event signal, thus causing the automatic activation of geographically co-located and community-enabled responses.

FIG. 6 presents a third scenario 600, in this case, a non-threatening scenario that nevertheless can cause undue expense for vehicle owners. A parking attendant is cruising the vicinity of vehicles 602, 604, 606, 608, and 610, looking for either illegally parked vehicles or those with expired parking passes. Vehicle 602 includes the occurrence detection IoT device 620. The occurrence that triggers the event in this scenario 600 is the issuance of a ticket by the parking attendant, who places the violation notice on the window of the vehicle 602. The sensor of the IoT device 620 notices that something has been placed on the windshield of the vehicle. In this example, the sensor of the IoT device 620 may be a camera pointing at the front windshield or may be a vibration sensor that notices that the movement of the windshield wiper. In either case, the IoT device 620 sends out an event signal after detecting the occurrence. Optionally, the mobile device of the owner of vehicle 602 is also notified.

In the scenario 600, making noise or flashing lights is not going to help the other vehicle owners. The other vehicle owners may want to know about the parking attendant though. So, upon occurrence of the event signal by the IoT device 620, the IoT device 612 of vehicle 604 sends a notification to the mobile device of the vehicle owner. Similarly, owners of vehicles 606, 608, and 610 are notified by their mobile device.

Up to now, the event signal sent by the IoT device that detected an occurrence caused geographically co-located and community-aware IoT devices to react, shown as a response in FIG. 1, FIG. 2, and FIG. 3. There may be cases, however, where the IoT device that detects the occurrence wants to send a response. For example, the IoT device may include a microphone in which a verbal message may be broadcast.

Figure 7:
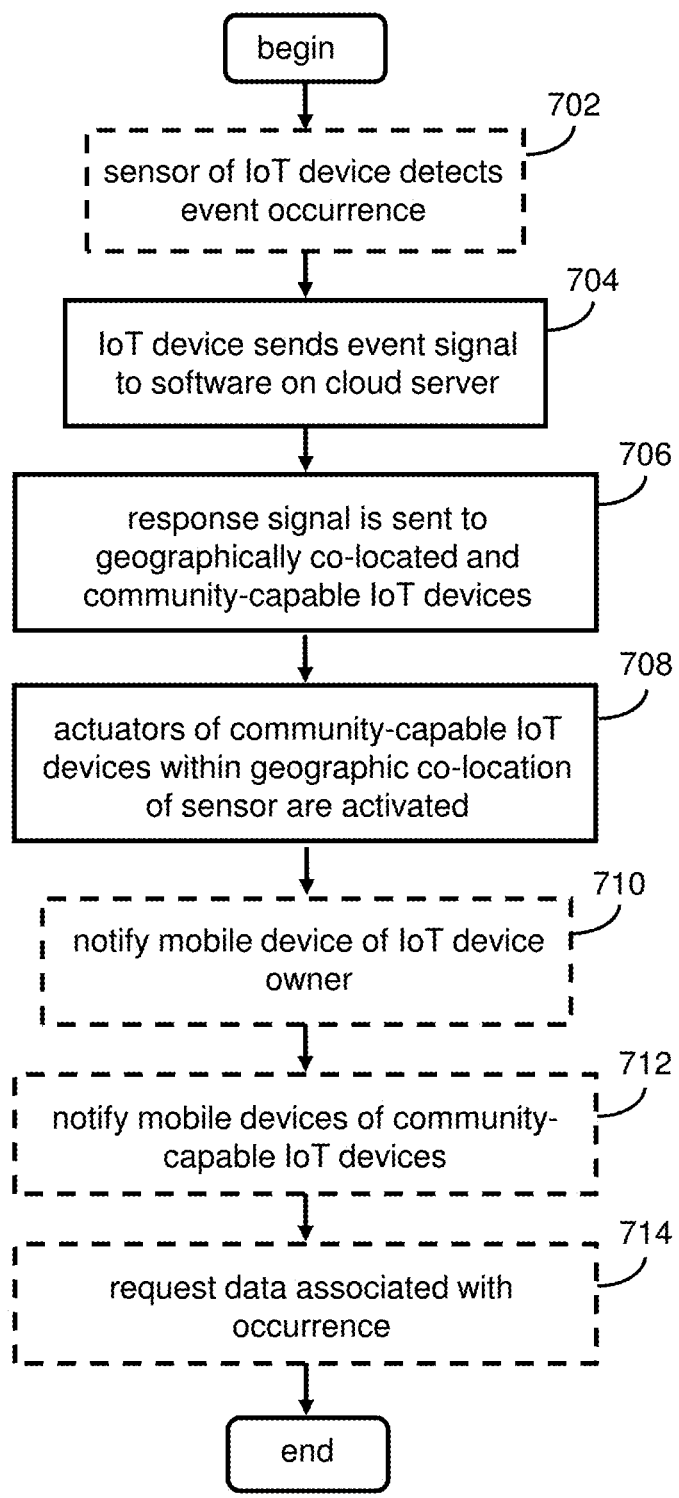
FIG. 7 is a flow diagram illustrating method operations of the smart device communication of FIG. 1, according to some embodiments.

FIG. 7 is a flow diagram of the method operations 700 of the smart device communication software of FIG. 2A, according to some embodiments. In some embodiments, the IoT devices are connected to one or more cloud servers, with the one or more servers controlling the sensors and actuators. In one embodiment, the environment involves an IoT device that has sensing of an object in geographic proximity to one or more community-capable IoT devices, for example, the attempted vehicle break-in in FIG. 4 or the parking ticket issuance in FIG. 6. In a second embodiment, the environment involves an IoT device activated by a person in geographic proximity to one or more community-capable IoT devices, for example, the use of an IoT-based panic button by a human.

For this reason, the first operation of FIG. 7 is shown as an optional operation. The sensor of the IoT device detects an event occurrence related to the object (block 702). This may be, for example, a sensor detecting a window breaking. The IoT device sends an event signal to the cloud server (block 704), to be received by the smart device communication software. In addition to the window breaking scenario, this operation may describe a user depressing an IoT-based panic button. The event signal transmission may be over WiFi, Bluetooth, NFC, and other communication means. The cloud server sends the response signal to be received by one or more geographically co-located IoT devices (block 706). Additionally, these devices have been pre-registered or pre-configured as community-capable, community responsive, or community-aware. Non-community-capable IoT devices would not be set up to detect the response signal.

The actuators of the community-capable IoT devices that received the response signal would be activated (block 708). As illustrated above, the activation may mean different things, depending on the device. FIG. 3 shows several different responses that may result from activation of the actuators. Optionally, the mobile device of the object is sent a notification by the smart device communication software (block 710). Or, the mobile device of the person who issued the panic alert is notified. As a third option, the mobile devices of the IoT devices that were activated are notified by the cloud server (block 712).

Finally, where a record of the incident has been made, such as when a video or audio recording has been made, the IoT device associated with the object may make a request for the data, whether from the cloud server on which the smart device communication resides or from another server (block 714). The smart device communication method 700 thus provides several options for utilizing co-located IoT devices to benefit more than just the individual owners of the devices.

Figure 8:
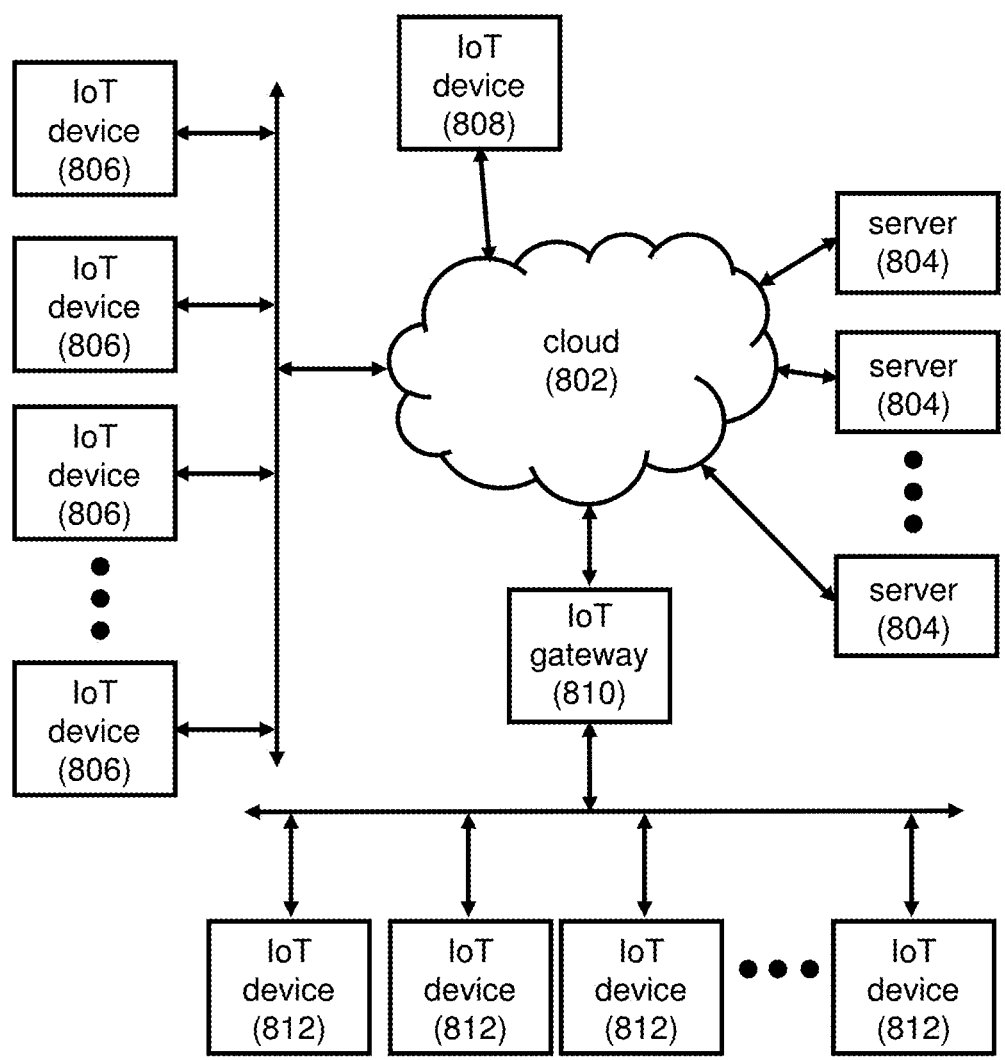
FIG. 8 is a block diagram of an Internet of Things network in which the smart device communication of FIG. 1 may operate, according to some embodiments.

FIG. 8 is a simplified illustration of an Internet of Things (IoT) network 800, according to some embodiments. The IoT network 800 includes a cloud 802, one or more servers 804, one or more IoT devices 806 that connect to the cloud, and one or more IoT devices 812 that connect to the cloud through an IoT gateway 810. The cloud 802 may be the Internet, a local area network (LAN), a wide-area network (WAN), a wireless LAN (WLAN), a wireless WAN (WWAN), a proprietary network, and so on. The IoT devices 812 interface with the cloud 802 via the IoT gateway 810. Cloud computing utilizes remote, networked computing resources to process, manage, and store data. These cloud resources enable IoT devices to interact with powerful back-end analytic and control capabilities.

The IoT devices 806 and 812 may include sensors and actuators that may be controlled by one of the servers 804. The IoT devices may include alarm systems, parking meters, traffic control lights, and so on. The IoT devices 806 and 812, communicating through the cloud 802, may also communicate with one another, with the one or more servers 804, and/or with the IoT gateway 810, as appropriate.

The IoT device 806 and 812 may include a network interface controller (NIC) for communication through an Ethernet interface, whether with the IoT gateway 810, with one or more of the servers 804, or with other IoT devices. The IoT devices may be part of an ad-hoc or mesh network in which different IoT devices communicate directly with one other. In one example, the mesh network communicates with the cloud 802 through the IoT gateway 810. There are protocols, such as Better Approach to Mobile Ad-hoc Networking (BATMAN) or optimized link state routing (OLSR), to enable this direct communication between IoT devices, although these are non-limiting examples.

Figure 9:
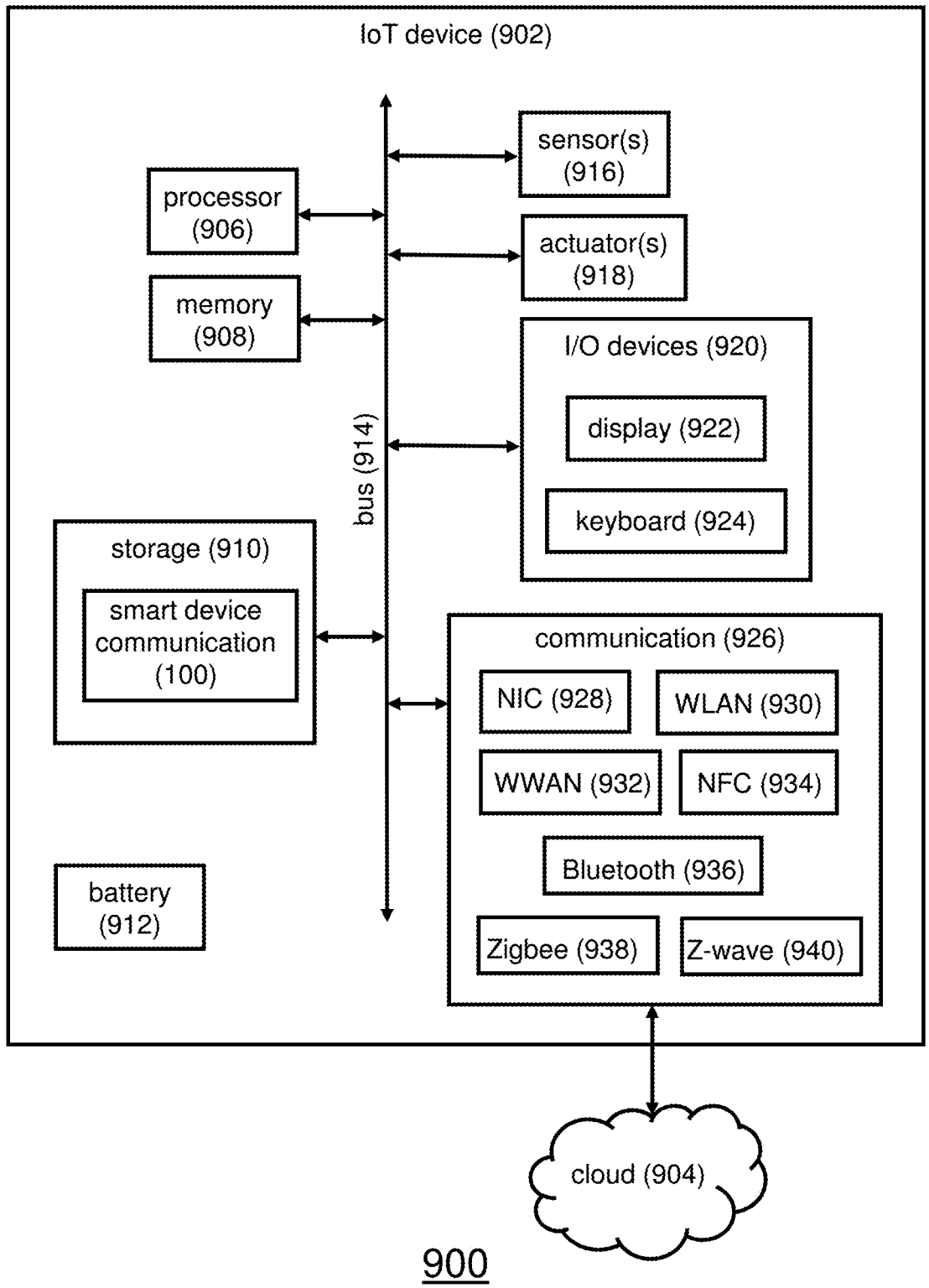
FIG. 9 is a block diagram of an IoT system from which the smart device communication of FIG. 1 may be initiated, according to some embodiments.

FIG. 9 is a simplified block diagram of a system 900 in which the smart device communication system 100 and the smart device communication software 200 operate, according to some embodiments. The IoT device 902 includes a processor 906, a memory 908, storage 910, communication means to interface with the cloud 904, such as a network interface card (NIC) 928, a WWAN 932, a WLAN 930, a Bluetooth 936, a Zigbee 938, and/or a Z-wave 940, for wireless or wired connection to the cloud. As examples, the IoT device 902 may communicate with the cloud 904 using Bluetooth, Near Field Communication (NFC), Wireless Fidelity (WiFi), and so on. Because IoT devices are often free-standing in-the-field devices, they may be powered by a battery 912.

The memory 906 is not a propagating signal divorced from the underlying hardware of the IoT device 902 and is thus non-transitory. The components of the IoT device 902 are connected by a bus 914. The processor 906, memory 908, and storage 910 may be any of a number of different types known to system design engineers. The IoT device 902 may further include I/O devices 920 such as a display 922 or keyboard 924.

The bus 914 may couple the processor 906 to devices, such as sensors 916 and actuators 918, which may be internal or external. The sensors 916 may include but are not limited to those that monitor temperature, flow, seismic activity, pressure, motion, speed, and may also include camera sensors, traffic sensors, and so on. The actuators 918 may include but are not limited to lights, alarms, cameras, and so on.

The smart device communication system software 200 may be stored in the non-volatile storage 910, and may be loaded into the memory 908, to be then executed by the processor 906. The IoT device 902 may be any of a variety of monitoring or actuating devices, including, but not limited to, a camera, an alarm device, a hand-held device, such as a smart phone, a smart television, a seismic sensor, a weather sensor, and so on.

The IoT device 902 may include any combinations of the components. The components may be implemented as integrated circuits, discrete electronic devices, hardware, software, firmware, or a combination of these. The IoT device 902 may also be incorporated into a larger system. Those skilled in the art will appreciate that the components illustrated in FIGS. 1-9 described above, and the additional diagram below, may be altered in a variety of ways. The order of the logic may be rearranged, some steps may be performed in parallel, illustrated logic may be omitted, other logic may be included, and so on.

Figure 10:
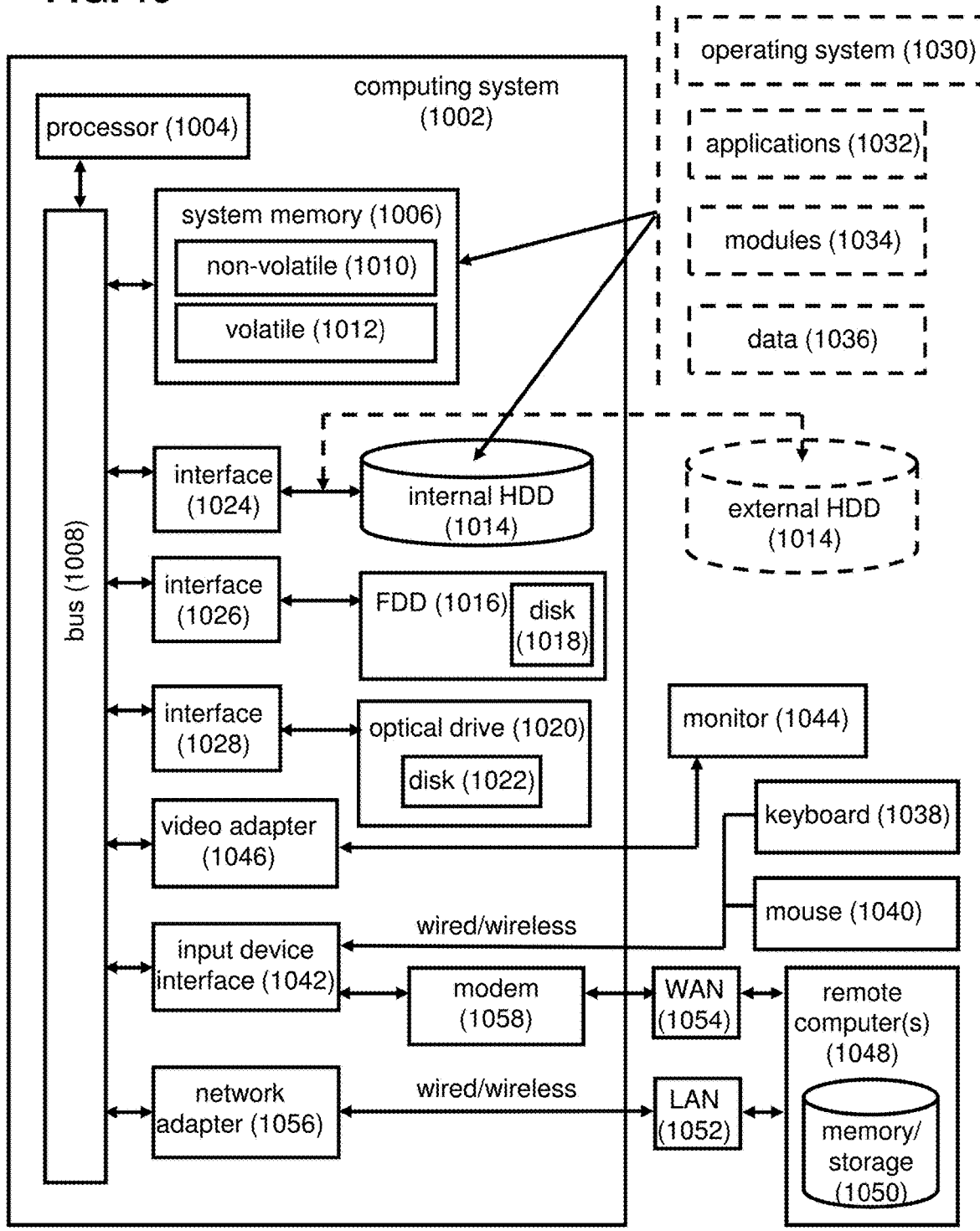
FIG. 10 is an embodiment of an exemplary computing architecture in which one or more embodiments of the smart device communication of FIG. 1 may operate, according to some embodiments.

FIG. 10 illustrates an embodiment of an exemplary computing architecture 1000 comprising a computing system 1002 that may be suitable for implementing various embodiments as previously described. In various embodiments, the computing architecture 1000 may comprise or be implemented as part of an electronic device. In some embodiments, the computing architecture 1000 may be representative, for example, of a system that implements one or more components of the smart device communication system 100 and method 700. In some embodiments, computing system 1002 may be representative, for example, of the mobile devices used in implementing the smart device communication system 100 and software 200. The embodiments are not limited in this context. More generally, the computing architecture 1000 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1002 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1002.

As shown in FIG. 10, the computing system 1002 comprises a processor 1004, a system memory 1006 and a system bus 1008. The processor 1004 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor.

The system bus 1008 provides an interface for system components including, but not limited to, the system memory 1006 to the processor 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computing system 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies. The computing system 1002 is generally is configured to implement all logic, systems, methods, apparatuses, and functionality described herein with reference to FIGS. 1-9.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of smart device communication system 100 and software 200.

A user can enter commands and information into the computing system 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computing system 1002. In addition to the monitor 1044, a computer typically includes other peripheral output devices, such as speakers, printers, and so forth.

The computing system 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computing system 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computing system 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computing system 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computing system 1002, or portions thereof, can be stored in the remote memory/storage device 1050. It will be appreciated that the network connections shown are exemplary and other means of establishing a communications link between the computers can be used.

The computing system 1002 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A cloud computing system configured to provide cloud services for a community of Internet of Things (IoT) devices, comprising:
    one or more servers comprising at least a processor; and
        a memory coupled to the processor, the memory comprising instructions configured to, when executed by the processor, cause the processor to:
        determine IoT devices of the community of IoT devices within a geographic radius of an IoT device, wherein each of the IoT devices comprise a device setting preconfigured prior to ownership by users to participate in the community of IoT devices, and each of the device settings is configurable to opt-out of participating in the community of IoT devices;
        receive, from the IoT device, an event signal based on an occurrence of an event detected by the IoT device; and
        send a response signal to a second IoT device of the community of IoT devices within the geographic radius, the response signal to cause activation of an actuator of the second IoT device, and wherein the IoT device detecting the event and the second IoT device are owned by different users.

2. The apparatus of claim 1, further comprising instructions configured to, when executed by the processor, cause the processor to send a notification to a mobile device associated with the IoT device in response to the occurrence of the event.

3. The apparatus of claim 1, further comprising instructions configured to, when executed by the processor, cause the processor to:
    receive a data request for a recording of the event; and
    send the recording to a mobile device associated with the IoT device.

4. The apparatus of claim 1, wherein the activation of the actuator of the second IoT device comprises one or more of:
    causing recording of a camera;
    causing locking of a door;
    causing honking of a horn or siren;
    causing beeping of an alarm; and
    causing intermittent flashing of a flood light.

5. The apparatus of claim 1, wherein the event signal to indicate that the event is breaking of a window detected by the IoT device, and the response signal to cause the activation of the actuator of the second IoT device to cause locking of a door and/or cause honking of a horn.

6. The apparatus of claim 1, wherein the event signal to indicate that the event is activation of a panic button of the IoT device, and the response signal to cause activation of a noise alert, an activation of flashing of vehicle lights, activation of an alarm of a vehicle, and/or activation of a flood light.

7. The apparatus of claim 1, wherein the event signal to indicate that the event is an issuance of a parking ticket detected by the IoT device, and the response signal to include a communication to a mobile device associated with the second IoT device.

8. A computer-implemented method, comprising:
    determining Internet of Things (IoT) devices of a community of Internet of Things (IoT) devices within a geographic radius of an IoT device, wherein each of the IoT devices is pre-configured with a device setting set at a time of manufacture to participate in the community of IoT devices, and each of the devices settings is configurable to opt-out of participating in the community of IoT devices;
    receiving an event signal based on an occurrence of an event detected by the IoT device;
    sending a response signal to a second IoT device of the community of IoT devices within the geographic radius, the response signal to cause activation of an actuator of the second IoT device, and wherein the IoT device detecting the event and the second IoT device owned by different users.

9. The computer-implemented method of claim 8, comprising sending a notification to a mobile device associated with the IoT device in response to the detection of the occurrence of the event.

10. The computer-implemented method of claim 8, comprising:
    receiving a data request for a recording of the event; and
    sending the recording to a mobile device associated with the IoT device.

11. The computer-implemented method of claim 8, wherein the activation of the actuator of the second IoT device comprises one or more of:
    causing recording of a camera;
    causing locking of a door;
    causing honking of a horn or siren;
    causing beeping of an alarm; and/or
    causing intermittent flashing of a flood light.

12. The computer-implemented method of claim 8, wherein the event signal indicating that the event is breaking of a window detected by the IoT device, and the response signal to cause the activation of the actuator of the second IoT device to cause locking of a door and/or cause honking of a horn.

13. The computer-implemented method of claim 8, wherein the event signal indicating that the event is activation of a panic button of the IoT device, and the response signal to cause activation of a noise alert, an activation of flashing of vehicle lights, activation of an alarm of a vehicle, and/or activation of a flood light.

14. The computer-implemented method of claim 8, wherein the event signal indicating that the event is an issuance of a parking ticket detected by the IoT device, and the response signal to include a communication to a mobile device associated with the second IoT device.

15. A non-transitory machine-readable storage medium comprising instructions that, when executed by a processor, cause the processor to:
    determine Internet of Things (IoT) devices of a community of IoT devices within a geographic radius of an IoT device, wherein each of the IoT devices is pre-configured at a time of manufacture with a device setting to participate in the community of IoT devices, and each of the devices settings is configurable to opt-out of participating in the community of IoT devices;
    receive, from the IoT device, an event signal based on an occurrence of an event detected by the IoT device; and
    send a response signal to a second IoT device of the community of IoT devices within the geographic radius, the response signal to cause activation of an actuator of the second IoT device, and wherein the IoT device detecting the event and the second IoT device owned by different users.

16. The machine-readable storage medium of claim 15, the processor to send a notification to a mobile device associated with the IoT device in response to the occurrence of the event.

17. The machine-readable storage medium of claim 15, the processor to:
    receive a data request for a recording of the event; and
    send the recording to a mobile device associated with the IoT device.

18. The machine-readable storage medium of claim 15, wherein the event signal to indicate that the event is breaking of a window detected by the IoT device, and the response signal to cause the activation of the actuator of the second IoT device to cause locking of a door and/or cause honking of a horn.

19. The machine-readable storage medium of claim 15, wherein the event signal to indicate that the event is activation of a panic button of the IoT device, and the response signal to cause activation of a noise alert, an activation of flashing of vehicle lights, activation of an alarm of a vehicle, and/or activation of a flood light.

20. The machine-readable storage medium of claim 15, wherein the event signal to indicate that the event is an issuance of a parking ticket detected by the IoT device, and the response signal to include a communication to a mobile device associated with the second IoT device.

* * * * *